United States Patent [19]
Schnaibel et al.

[11] Patent Number: 5,590,521
[45] Date of Patent: Jan. 7, 1997

[54] METHOD AND DEVICE FOR FORMING A SIMULATED SIGNAL OF THE TEMPERATURE OF THE EXHAUST GAS, EXHAUST GAS SENSOR OR CATALYTIC CONVERTER

[75] Inventors: Eberhard Schnaibel, Hemmingen; Erich Schneider, Kirchheim; Frank Blischke, Stuttgart, all of Germany

[73] Assignee: Robert Bosch GmbH, Stuttgart, Germany

[21] Appl. No.: 336,959

[22] Filed: Nov. 10, 1994

[30] Foreign Application Priority Data

Nov. 10, 1993 [DE] Germany ............... 43 38 342.4

[51] Int. Cl.⁶ .................................. F01N 3/20
[52] U.S. Cl. ............... 60/274; 60/276; 60/277; 60/309; 73/118.1
[58] Field of Search ............... 60/274, 309, 276, 60/277; 73/118.1

[56] References Cited

U.S. PATENT DOCUMENTS

| | | | |
|---|---|---|---|
| 4,291,572 | 9/1981 | Maurer et al. | 73/23 |
| 4,656,829 | 4/1987 | Creps | 60/276 |
| 5,158,063 | 10/1992 | Hosoda | 123/676 |
| 5,214,915 | 6/1993 | Schneider | 73/118.1 |

FOREIGN PATENT DOCUMENTS

| | | |
|---|---|---|
| 2731541A1 | 2/1979 | Germany . |
| 4121396 | 1/1993 | Germany . |
| 8904917 | 6/1989 | WIPO . |

*Primary Examiner*—Douglas Hart
*Attorney, Agent, or Firm*—Kenyon & Kenyon

[57] ABSTRACT

A method and a device for forming a simulated signal of the temperature of the exhaust gas, exhaust gas sensor or catalytic converter for an internal combustion engine. Using a temperature characteristic depending on the air mass stream, and two low-pass filters with time constants depending on the air mass stream, the exhaust gas temperature upstream from the catalytic converter, the exhaust gas sensor temperature and the catalytic converter temperature are simulated. The air mass, integrated since the time the internal combustion engine is started, is compared with two threshold values to determine whether or not there is still condensation water present in the exhaust gas channel upstream from the catalytic converter and/or in the catalytic converter itself. If condensation water is present, the simulated temperature(s) is limited to a value of approximately 50° to 60° C. If the entire condensation water in the exhaust gas channel and/or in the catalytic converter was not evaporated during a short run of the internal combustion engine, or if the temperature of the internal combustion engine is extremely low when it is started, then extended times for evaporation of the condensation water are estimated and simulated by increased threshold values for the integrated air mass.

12 Claims, 4 Drawing Sheets

METHOD AND DEVICE FOR FORMING A SIMULATED SIGNAL OF THE TEMPERATURE OF THE EXHAUST GAS, EXHAUST GAS SENSOR OR CATALYTIC CONVERTER

BACKGROUND OF THE INVENTION

The present invention relates to a method and a device for forming a simulated signal of the temperature of exhaust gas, an exhaust gas sensor or a catalytic converter for an internal combustion engine, from operating characteristics.

German Patent Application No. DE 27 31 541 discusses simulating exhaust gas temperature based on the load state of the internal combustion engine, thereby eliminating the need for a temperature sensor in the exhaust gas channel. The heating element of an oxygen sensor is controlled as a function of the simulated exhaust gas temperature.

An object of the present invention is to achieve the greatest possible accuracy in simulating the exhaust gas temperature and/or the exhaust gas sensor temperature and/or the catalytic converter temperature using a method and a device of the aforementioned type.

SUMMARY OF THE INVENTION

The present invention advantageously determines the temperature of the exhaust gas and/or the exhaust gas sensor and/or the catalytic converter relatively accurately, thereby eliminating the need for corresponding temperature sensors. The present invention provides a decisive improvement over the state of the art because it considers the influence, exerted by any liquid which might be present in the exhaust gas channel or in the catalytic converter, on the temperature of the exhaust gas and/or on the temperature of the exhaust gas sensor and/or on the temperature of the catalytic converter. If it is expected that liquid will be present in the exhaust gas channel of the internal combustion engine and/or in the catalytic converter, the simulated exhaust gas temperature and/or the simulated exhaust gas sensor temperature and/or the simulated catalytic converter temperature are influenced accordingly, for example by setting an upper limit on the simulated temperature.

The liquid is generally condensation water which forms from the water vapor contained in the exhaust gases in the initial phase, after the internal combustion engine is started, when the temperature of the exhaust gas channel, i.e., the catalytic converter is below a threshold value. Fuel or oil residues can be found mixed in with the condensation water, and dissolved exhaust gas components can be contained in it. In the following, the liquid is referred to as condensation water, without discussing possible substances mixed with it in any detail.

A comparison of the amount of air, the mass of air, or the amount of fuel, integrated since the internal combustion engine was started, with a certain threshold value, can serve as a criterion for the presence of condensation water in the exhaust gas channel. When the threshold value has not been exceeded, condensation water is present.

In an advantageous further development of the present invention, a greater threshold value is used if the condensation water in the exhaust gas channel and/or in the catalytic converter was not completely removed during the last run of the internal combustion engine, or if the temperature of the internal combustion engine is below a minimum temperature, which can occur, for example, when the internal combustion engine is started.

In another advantageous development of the present invention, special operating situations of the internal combustion engine, in which the criterion for the presence of condensation water as described above does not apply, are also considered. For example, it is assumed that no condensation water is present in the exhaust gas channel and/or in the catalytic converter (and the limitation of the exhaust gas temperature and the limitation of the catalytic converter temperature canceled immediately) if the temperature of the internal combustion engine is above a temperature threshold, which can be preset, when the internal combustion engine is started.

To simulate the exhaust gas temperature, base values for the exhaust gas temperature under stationary operating conditions and a preset temperature value for coasting are fed into a first filter in normal operation of the internal combustion engine. The base values for the exhaust gas temperature under stationary operating conditions are determined as a function of the amount of air or the mass of air drawn in by the internal combustion engine, and/or of the amount of fuel metered into the internal combustion engine, and the preset temperature value for coasting is read out of the fixed value memory. If an unheated exhaust gas sensor is arranged upstream from the catalytic converter, the exhaust gas sensor temperature approximately corresponds to the exhaust gas temperature, where a time delay must be considered, depending on the design of the exhaust gas sensor. If the exhaust gas sensor is arranged downstream from the catalytic converter, the catalytic converter temperature must be used to determined the exhaust gas sensor temperature, instead of the exhaust gas temperature. If a heated exhaust gas sensor is used, the heating output passed to the sensor must also be considered.

To simulate the catalytic converter temperature, the values for the exhaust gas temperature output by the first filter are fed into a second filter. The time constants of the first and the second filter can be changed as a function of the amount of air or the mass of air drawn in by the internal combustion engine and/or of the amount of fuel metered into the internal combustion engine, so that the time progression of the exhaust gas temperature and/or the exhaust gas sensor temperature and/or the catalytic converter temperature can be simulated very accurately.

By activating corresponding limiting functions of the filters, the influence of any condensation water that might be present, on the simulated exhaust gas temperature and/or exhaust gas sensor temperature and/or catalytic converter temperature is considered. For example, the simulated temperatures are limited to preset values if the presence of condensation water is expected in the exhaust gas channel of the internal combustion engine and/or in the catalytic converter.

DETAILED DESCRIPTION

Knowing the temperature of the exhaust gas and/or the catalytic converter is important for a number of applications; for example: determining the temperature at which the catalytic converter comes on; recognizing the operating readiness of an exhaust gas sensor arranged upstream from the catalytic converter; and protecting exhaust gas sensors arranged in the exhaust gas channel from damage due to excess temperatures or condensation water.

Figure 1:
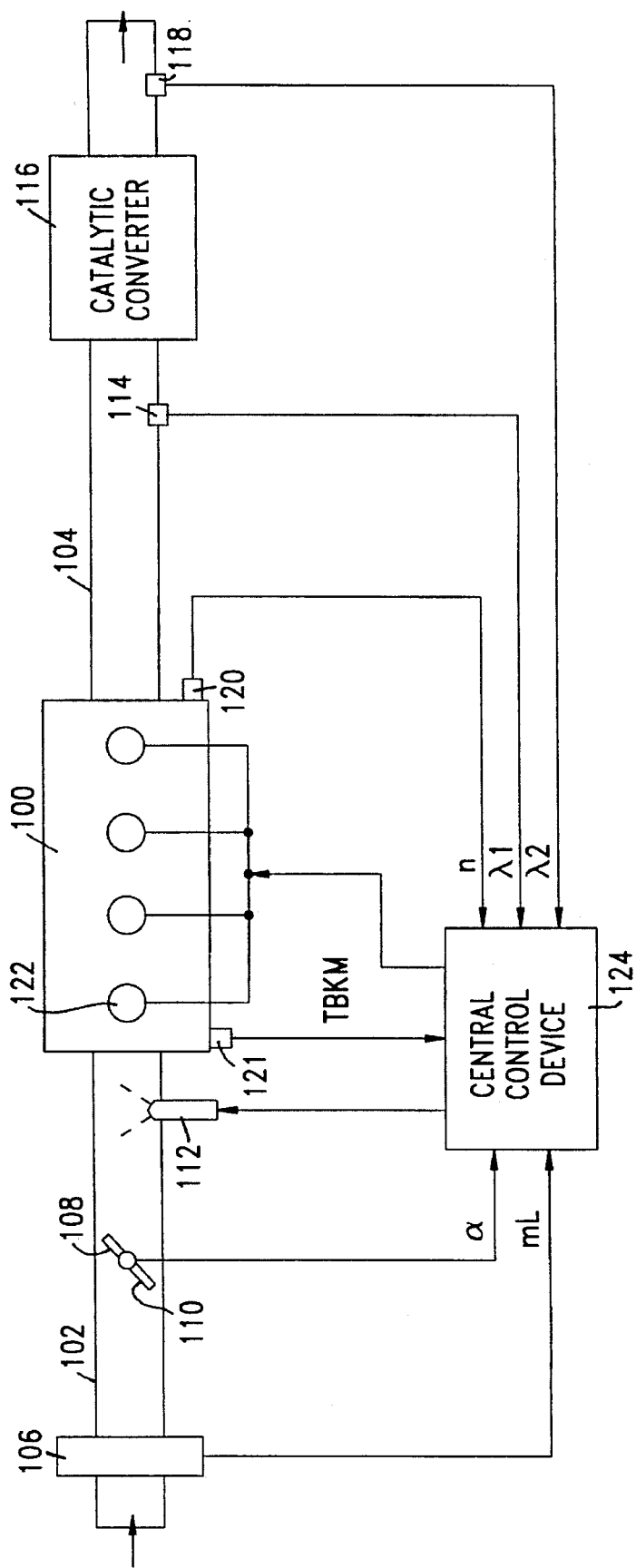
FIG. 1 is a block diagram showing the technical environment in which the present invention is to be used.

FIG. 1 is a block diagram which illustrates the technical environment in which the present invention is used. An air/fuel mixture is passed to an internal combustion engine 100 via an intake channel 102. Exhaust gases from the internal combustion engine 100 are passed into an exhaust gas channel 104. In the intake channel 102, an air amount meter or air mass meter 106 (e.g., a hot-film air mass meter), a throttle valve 108, and one or more injection nozzles 112, are arranged in the direction of the flow of air being drawn in. The throttle valve 108 includes a sensor 110 to determine its opening angle. In the exhaust gas channel 104, a first exhaust gas sensor 114, a catalytic converter 116 and a second exhaust gas sensor 118 are arranged in the direction of flow of the exhaust gas.

An rpm sensor 120 and a temperature sensor 121 are affixed at the internal combustion engine 100. Furthermore, the internal combustion engine 100 has four spark plugs 122, for example, to ignite the fuel/air mixture in the cylinders.

The output signals mL of the air amount meter or air mass meter 106, $\alpha$ of the sensor 110 to detect the opening angle of the throttle valve 108, $\lambda 1$ of the first exhaust gas sensor 114, $\lambda 2$ of the second exhaust gas sensor 118, n of the rpm sensor 120, and TBKM of the temperature sensor 121 are passed to a central control device 124 via corresponding connecting lines. The central control device 124 evaluates the sensor signals and controls the injection nozzle(s) 112 and the spark plugs 122.

Figure 2:
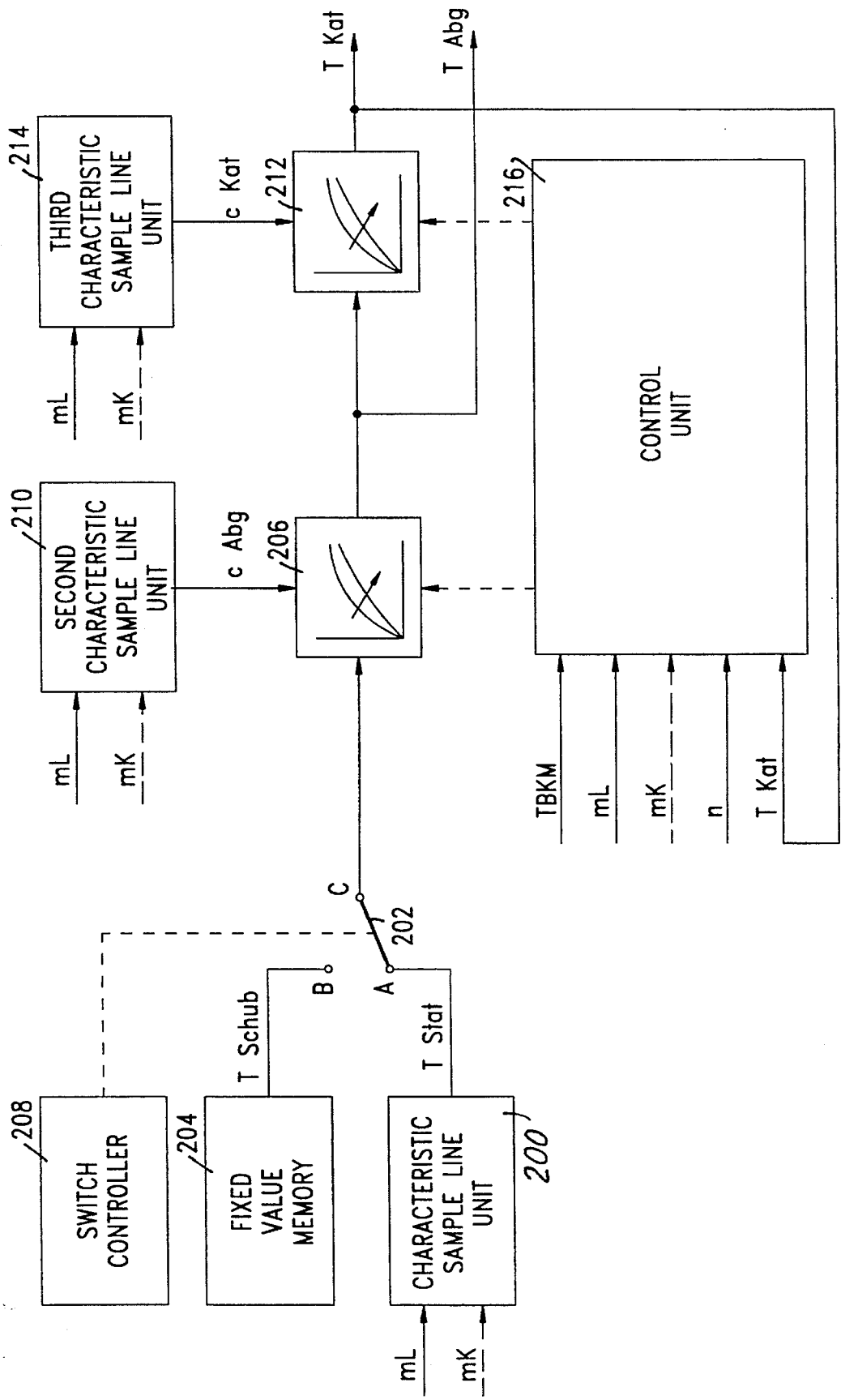
FIG. 2 is a block diagram of the device for determining a simulated exhaust gas temperature and a simulated catalytic converter temperature according to the present invention.

FIG. 2 is a block schematic of the device for determining a simulated exhaust gas temperature and a simulated catalytic converter temperature according to the present invention. An input of a characteristic sample unit 200 is supplied with a signal mL representing the air mass flow output by the sensor 106 (shown in FIG. 1). A broken arrow indicates that other input signals, from which the exhaust gas temperature can be estimated, may also be applied at further inputs of the characteristic sample unit 200, for example the fuel amount mK metered in per time unit. This also applies to the other blocks (e.g. 210, 214, 216) of FIG. 2, for which the air mass flow mL represents an input signal, likewise for FIG. 3 and FIG. 4 (e.g., 300). The characteristic line unit 200 stores base values TStat representing exhaust gas temperatures as a function of the air mass flow mL under stationary operating conditions. The output of the characteristic line unit 200 is coupled with a contact A of a switch 202. Contact B of the switch 202 is coupled with the output of a fixed-value memory 204 and a contact C is coupled with the input of a first filter 206. The switch 202 can connect contacts A and C together in a switch position AC, and can connect contacts B and C in a switch position BC. The switch 202 is controlled by switch controller 208. The switch controller recognizes whether or not thrust shut-off has occurred.

If thrust shut-off has occurred, the switch controller 208 sets the switch 202 into the switch position BC, so that the output of the fixed value memory 204 is coupled with the input of the first filter 206. A value for the exhaust gas temperature TSchub, occurring at thrust shut-off, is stored in the fixed value memory 204. If the switch controller 208 determines that no thrust shut-off has occurred, it sets the switch 202 into the switch position AC, whereby the output of the characteristic line unit 200 is coupled with the input of the first filter 206.

Another input of the first filter 206 is coupled with an output of a second characteristic line unit 210. The second characteristic line unit 210 stores values for the time constant cAbg of the filter 206 in memory as a function of the air mass flow mL. A signal mL for the air mass flow is applied at the input of the characteristic line unit 210. A signal TAbg representing the exhaust gas temperature upstream from the catalytic converter 116 is made available at the output of the first filter 206.

The output of the first filter 206 is coupled with an input of a second filter 212. Another input of the second filter 212 is coupled with an output of a third characteristic line unit 214. The third characteristic line unit 214 stores values for the time constant cKat of the second filter 212 in memory as a function of the air mass flow mL. A signal mL for the air mass flow mL is applied at the input of the third characteristic line unit 214. A signal TKat representing for the temperature of the catalytic converter 116 is made available at the output of the second filter 212.

In addition to the inputs already described, the first filter 206 and the second filter 212 each possess a control input, through which a limiting function can be activated in each instance. The limiting functions limit the output signal of respective ones of the filters to respective maximum values. The maximum values can be preset. The two control inputs are each coupled with outputs of a control unit 216. The control unit 216 has four inputs. A signal TBKM for the temperature of the internal combustion engine 100 is applied at a first input, the signal mL for the mass air flow is applied at a second input, a signal n for the rpm's of the internal combustion engine is applied at a third input, and the signal TKat for the temperature of the catalytic converter 116, which is picked up at the output of the filter 212, is applied at a fourth input. The control unit 216 determines whether or not condensation water is expected in the exhaust gas channel 104 upstream from the catalytic converter 116, and whether condensation water is to be expected in the catalytic converter 116. If condensation water is expected upstream from the catalytic converter 116, the control unit 216 emits a limiting signal to the first filter 206. If condensation water is expected in the catalytic converter 116, the control unit 216 emits a limiting signal to the second filter 212.

The block schematic shown in FIG. 2 operates as follows. The characteristic line unit 200 provides a base value Tstat for the exhaust gas temperature at stationary operating conditions based on the signal mL for the air mass flow. The base value TStat indicates the exhaust gas temperature, upstream from the catalytic converter 116, under stationary operating conditions. When a thrust shut-off exists however, the actual exhaust gas temperature can be significantly lower than the base value TStat read from the characteristic line unit 200. Therefore, in case of thrust shut-off, the base value TStat is not read from the characteristic line unit 200, but rather, the value TSchub stored in the fixed value memory 204 is read and passed to the first filter 206. The switch controller 208 recognizes whether or not thrust shut-off has occurred and sets the switch 202 into the switch position BC when thrust shut-off is activated, and into the switch position AC when thrust shut-off is deactivated.

The time progression of the exhaust gas temperature TAbg upstream from the catalytic converter 116 is simulated by the first filter 206. The first filter 206 may be designed as a low-pass filter. The time constant cAbg of the first filter 206 depends on the air mass flow mL. The time constant cAbg is stored in memory in the second characteristic line unit 210. While condensation water is present in the exhaust gas channel 104 upstream from the catalytic converter 116, the temperature there will not increase above a maximum value of approximately 50° to 60° C.

The first filter 206 can be caused to output temperature values that are lower than the stated maximum value, via the control input from the control unit 216. This will always occur if, after it evaluates its input signals, the control unit 216 determines that condensation water is to be expected in the exhaust gas channel 104 upstream from the catalytic converter 116. The limit is then activated via the control input of the filter 206, and it remains in effect until the presence of condensation water is no longer expected. Details concerning the structure and operator of the control 216 are set forth below with reference to FIGS. 3 and 4.

The temperature TAbg output by the first filter 206 can be passed to any desired functional unit which needs this temperature value as an input value. In the embodiment described here, the temperature TAbg is also passed to the second filter 212. The second filter 212 determines the temperature TKat of the catalytic converter 116. If the temperature TKat of the catalytic converter 116 is not needed, the second filter 212 and the third characteristic line unit 214 can be eliminated.

The second filter 212 can be a low-pass filter and is supposed to simulate the time progression of heating of the catalytic converter. The second filter 212 possesses a time constant cKat which depends on the air mass flow mL. The time constant cKat is provided by the third characteristic line 214 based on the air mass flow mL. An input for limiting the output temperature values to a temperature of approximately 50° to 60° C. is also provided on the second filter 212. This limitation is activated by the control unit 216 if it determines that condensation water is to be expected in the catalytic converter 116. The temperature TKat output by the second filter 212 can be fed into any desired functional units which need this temperature as an input value.

Figure 3:
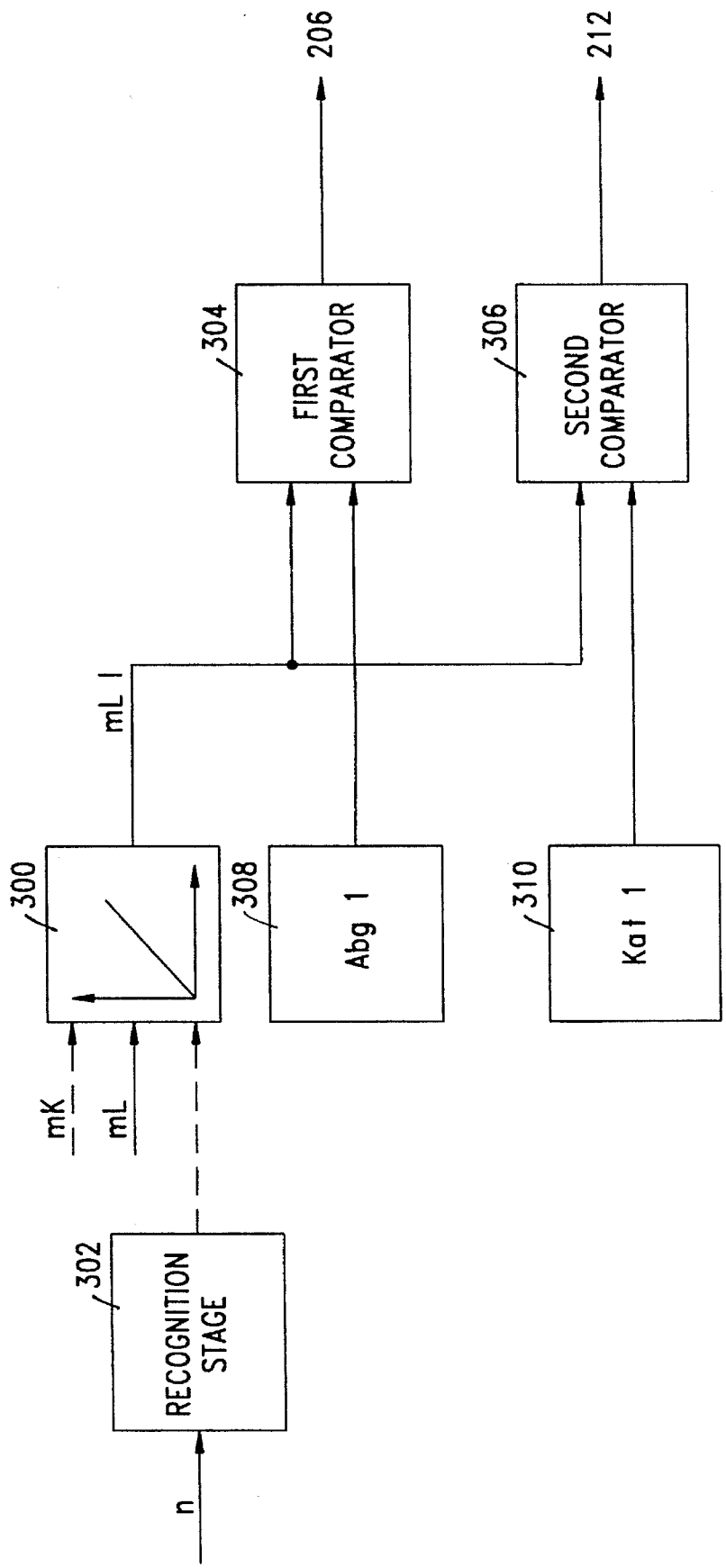
FIG. 3 is a block diagram illustrating a control unit from FIG. 2, which is used to determine whether or not the presence of condensation water in the exhaust gas channel and/or in the catalytic converter is expected.

FIG. 3 is a block schematic of the internal structure of the control unit 216 from FIG. 2. The signal mL for the air mass flow is applied at an input of an integrator 300. The integrator 300 integrates this signal and provides a signal mLI, representing the integrated air mass, at its output. The integrator 300 can be reset via a control input. The control input is coupled with the output of a recognition stage 302, which recognizes when the internal combustion engine 100 is started. The signal n representing the rpm's of the internal combustion engine 100 is applied at the input of the recognition stage 302.

The output of the integrator 300 is coupled both with a first input of a first comparator 304 and with a first input of a second comparator 306. The second input of the first comparator 304 is coupled with the output of a fixed value memory 308 which stores a threshold value Abg1. The threshold value Abg1 is chosen such that, as a rule, no condensation water is present in the exhaust gas channel upstream from the catalytic converter 116 precisely when the air mass mLI, integrated since the time the internal combustion engine 100 was started, exceeds the threshold value Abg1.

The first comparator 304 determines whether or not the threshold value Abg 1 has been exceeded by mLI. The first comparator 304 compares the signal mLI with the value Abg1 and provides a signal available at its output if mLI is greater than Abg1. This signal is passed on to the control input of the first filter 206 shown in FIG. 2 and causes the limiting function of the first filter 206 to be deactivated. When the limiting function is deactivated, the simulated exhaust gas temperature TAbg upstream from the catalytic converter 116 can rise above the limit value of approximately 50° to 60° C., effective immediately since no condensation water is expected in the exhaust gas channel upstream from the catalytic converter.

The second input of the second comparator 306 is coupled with the output of a fixed value memory 310. The fixed value memory stores a threshold value Kat1. The threshold value Kat1 is chosen such that, as a rule, no condensation water is present in the catalytic converter 116 precisely when the air mass mLI, integrated since the time that the internal combustion engine 100 was started, exceeds the threshold value Kat1. The second comparator 306 determines whether or not the threshold value Kat1 has been exceeded by mLI. If mLI is greater than the threshold value Kat1, the second comparator 212 outputs a signal to the control input of the second filter 212 shown in FIG. 2 thereby canceling the limiting of the second filter 212 to a temperature of approximately 50° to 60° C.

Figure 4:
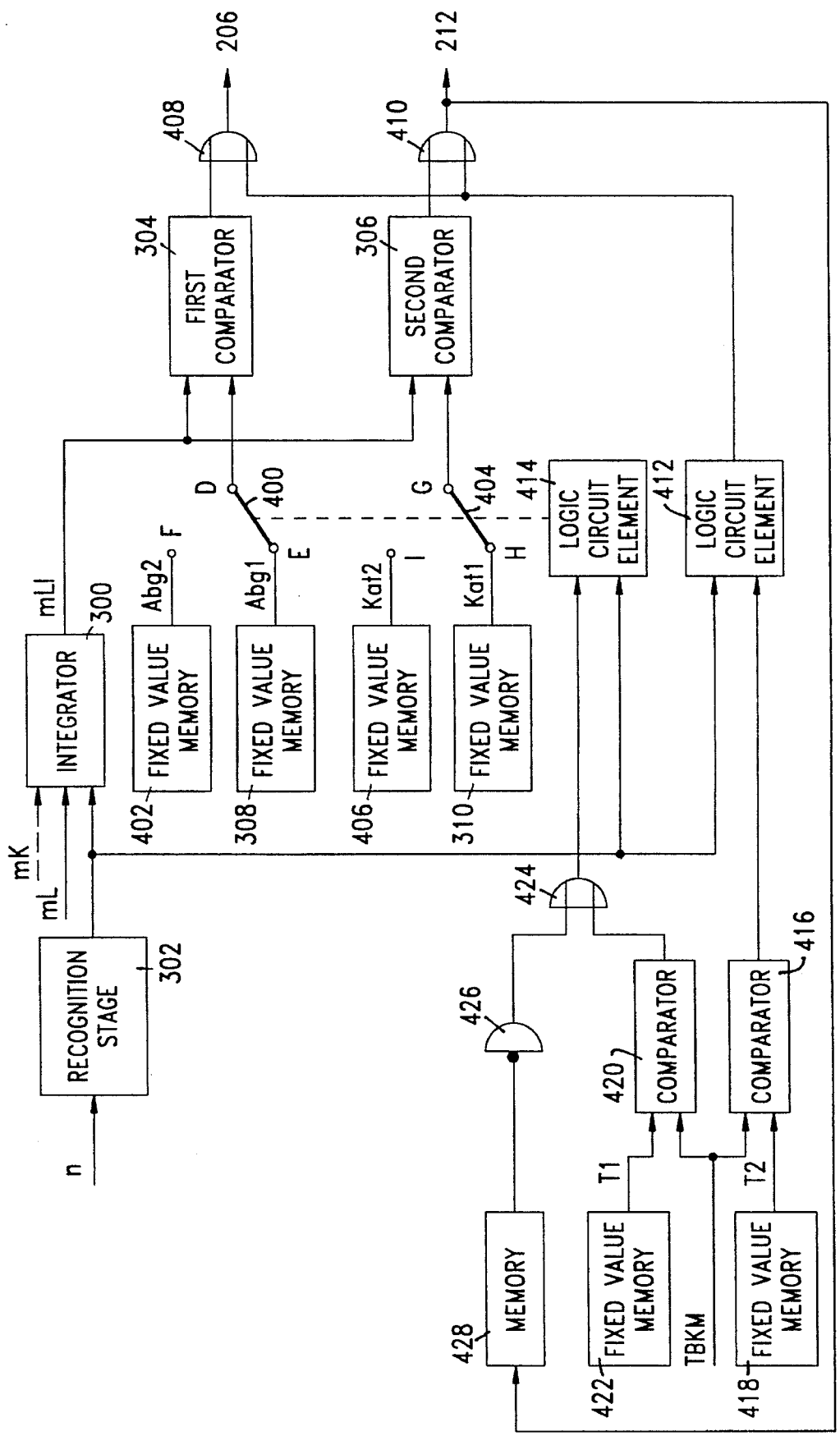
FIG. 4 is a block diagram of the internal structure of the control unit from FIG. 2.

FIG. 4 is a block schematic which illustrates additional details of the representation shown in FIG. 3. In addition to the description of elements in FIG. 3, for example, devices are a shown which select greater threshold values Abg2, or Kat2, for the air mass mLi, integrated since the time the internal combustion engine 100 was started, if the condensation water in the catalytic converter was not completely evaporated during the last run of the internal combustion engine 100. In such a condition, it should be assumed that a greater amount of condensation water is in the exhaust gas channel 104, and/or in the catalytic converter 116.

Furthermore, devices are provided in the block schematic of FIG. 4 which also select the greater threshold values Abg2 or Kat2 if the temperature TBKM of the internal combustion engine 100 is particularly low when it is started. In addition, devices are also provided which deactivate the limiting function of the first and second filters 206 and 212 (shown in FIG. 2) when the internal combustion engine 100 is started, if the temperature TBKM of the internal combustion engine 100 is particularly high when it is started. Details of the above mentioned devices of FIG. 4 are described in the following.

The blocks described with reference to FIG. 3 above are labeled with the reference symbols. The signal mL for the air mass flow is applied at the first input of the integrator 300. The second input of the integrator 300 is coupled with the output of the recognition stage 302. The recognition stage 302 is supplied with the rpm value n, recognizes when the internal combustion engine 100 is started, and outputs a corresponding signal. The output mLI of the integrator 300 is coupled with the first input of the first comparator 304 and with the first input of the second comparator 306 via connecting lines.

Thus, the air mass mLI, integrated since the internal combustion engine was started, is passed to the first inputs of the first and second comparators 304 and 306. The second input of the first comparator 304 can be optionally coupled, through switch 400, with the output of the fixed value memory 308 (switch position DE), or with the output of a fixed value memory 402 (switch position DF). The threshold value Abg1 is stored in the fixed value memory 308, while the threshold value Abg2 is stored in the fixed value memory 402. The second input of the second comparator 306 can be optionally coupled, through switch 404, with the output of the fixed value memory 310 (switch position GH) or with the output of a fixed value memory 406 (switch position GI). The threshold value Kat1 is stored in the fixed value memory 310, while the threshold value Kat2 is stored in the fixed value memory 406.

The output of the first comparator 304 is coupled with the first input of a first OR gate 408 and the output of the second comparator 300 is coupled with the first input of a second OR gate 410. The second inputs of the first and second OR gates 408 and 410 are coupled with each other and with the output of a logic circuit element 412. The first input of the logic circuit element 412 is coupled with the first input of another logic circuit element 414 and with the output of the recognition stage 302.

The second input of the logic circuit element 412 is coupled with the output of a comparator 416. If the comparator 416 outputs a signal when the internal combustion engine 100 is started, which is indicated by a signal at the output of the recognition stage 302, the logic circuit element 412 emits a signal until the internal combustion engine is shut off again. If, on the other hand, the comparator 416 does not emit a signal when the internal combustion engine is turned on, then the logic circuit 412 also does not deliver a signal at the output. In this way, the logic circuit 412 acts like an AND gate.

The comparator 416 has a first input, which is coupled with the output of a fixed value memory 418, and a second input, which is coupled both with the temperature sensor 121 which determines the temperature TBKM of the internal combustion engine 100. The comparator 420 has a first input coupled with the temperature sensor 121 and a second input coupled with the output of a fixed value memory 422. A threshold value T1, for the temperature TBKM of the internal combustion engine 100, is stored in the fixed value memory 422, and a threshold value T2 is stored in the fixed value memory 418.

The comparator 416 compares the temperature TBKM of the internal combustion engine 100 with the threshold value T2 and emits a signal at its output if TBKM is greater than T2. The comparator 420 compares the temperature TBKM of the internal combustion engine 100 with the threshold value T1 and emits a signal at the output if TBKM is less than T1. The output of the comparator 420 is coupled with a first input of an OR gate 424. The second input of the OR gate 424 is coupled with the output of an inverter 426.

The input of the inverter 426 is coupled with the output of a memory 428. The memory 428 contains information representing whether or not the condensation water in the catalytic converter 116 was completely evaporated the last time the internal combustion engine 100 was run. If the condensation water was completely evaporated, the memory 428 delivers a signal at its output. The input of the memory 428 is coupled with the output of the second OR gate 410.

The OR gate 424 delivers a signal at its output if the inverter 426 or the comparator 420 delivers a signal. If the OR gate 424 provides an output when the internal combustion engine 100 is started, the logic circuit element 414 sets the switch 400 to the switch position DF and sets the switch 404 to the switch position GI. If, on the other hand, no signal is provided at the output of the OR element 424 when the internal combustion engine is started, the logic circuit element 414 sets the switch 400 to the switch position DE and sets the switch 404 to the switch position GH.

A signal will be provided at the output of the OR element 424 in the following two operating situations of the internal combustion engine 100.

1. When the comparator 420 finds that the temperature TBKM of the internal combustion engine 100 is less than the threshold value T1 stored in the fixed value memory 422, i.e., when the internal combustion engine 100 is very cold.
2. When the memory 428 contains the information that during the last run of the internal combustion engine, the condensation water in the exhaust gas channel 104 and/or in the catalytic converter 116 was not completely evaporated.

In both operating situations, a greater threshold value for the air mass mLI, integrated since the time the internal combustion engine was started, must be assumed before all condensation is completely evaporated. Thus the logic circuit element 414 sets the switches 400 and 404, respectively, such that the greater threshold values Abg2 and Kat2, respectively, are used for the comparisons in the first and second comparators 304 and 306, respectively.

In another operating situation, the temperature TBKM is still high enough, when the internal combustion engine 100 is started, that the presence of condensation water cannot be expected in the exhaust gas channel 104 and/or in the catalytic converter 116. In this operating situation, the comparator 416 finds that the temperature TBKM of the internal combustion engine 100 is greater than the temperature T2 stored in the fixed value memory 418, and outputs a signal to the logic circuit element 412. At the same time, the recognition stage 302 recognizes that the internal combustion engine 100 is being started, and consequently also outputs a signal to the logic circuit element 412.

The logic circuit element 412 thereupon outputs a signal to the first and second OR gates 408 and 410, which in turn cause the limiting functions of the first and second 206 and 212 to be deactivated. Therefore, if condensation water is not expected in the exhaust gas channel 104 and/or in the catalytic converter 116 when the internal combustion engine 100 is started, due to the high engine temperature, the limiting functions of the filters 206 and 212 are cancelled immediately. This means that the temperatures TAbg and TKat output by the filters are derived from the values output by the characteristic line unit 200 and the fixed value memory 204, respectively.

The method according to the present invention can be supplemented by additional criteria for the presence or absence of condensation water in the exhaust gas channel 104 of the internal combustion engine 100, i.e. in the catalytic converter 116. Depending on the application, the above criteria can also be replaced with other suitable criteria.

What is claimed is:

1. A method for forming a simulated signal representing a temperature of at least one of exhaust gas, an exhaust gas sensor, and a catalytic converter of an internal combustion engine, the method comprising the steps of:
   a) using operating characteristics of the internal combustion engine to simulate the temperature; and
   b) using at least one liquid signal as one of the operating characteristics, the at least one liquid signal being indicative of an occurrence of liquid in at least one of an exhaust gas channel of the internal combustion engine and the catalytic converter.

2. The method according to claim 1 wherein the liquid signal is generated while at least one of the following, values, integrated from a time at which the internal combustion engine was started, is below a threshold value: an air amount, an air mass, and a fuel amount.

3. The method according to claim 2 further comprising step of:

presetting the threshold value to a greater value if the liquid in the at least one of the exhaust gas channel and the catalytic converter was not completely removed during a previous running of the internal combustion engine, or if a temperature of the internal combustion engine is below a preset minimum temperature when the internal combustion engine is started.

4. The method according to claim 1 further comprising the step of:

preventing a generation of the liquid signal if a temperature of the internal combustion engine is above a preset temperature threshold when the internal combustion engine is started.

5. The method according to claim 1 further comprising the step of:

feeding one of base values representing an exhaust gas temperature under stationary operating conditions and a preset temperature value for coasting, into a first filter to form the simulated signal representing the at least one of the exhaust gas temperature and the exhaust gas sensor temperature in a predetermined operation of the internal combustion engine.

6. The method according to claim 5 further comprising the steps of:

determining base values for the exhaust gas temperature under stationary operating conditions as a function of at least one of an air amount flow drawn in by the internal combustion engine, an air mass flow drawn in by the internal combustion engine, and an amount of fuel metered in per time unit; and reading out the preset temperature value for coasting from a fixed value memory.

7. The method according to claim 5 further comprising the step of:

forming the simulated signal representing the catalytic converter temperature by the sub-step of:

i) feeding values for the exhaust gas temperature by the first filter into a second filter.

8. The method according to claim 5 wherein at least one of a time constant of the first filter and a time constant of a second filter, can be changed as a function of at least one of an air amount flow drawn in by the internal combustion engine, an air mass flow drawn in by the internal combustion engine, and an amount of fuel metered in per time unit.

9. The method according to claim 5 wherein the liquid signal activates a limitation, via a control input of at least one of the first filter and a second filter, wherein the limitation limits values output by the first filter representing the at least one of the exhaust gas temperature and the exhaust gas sensor temperature, and wherein the limitation limits values output by the second filter representing the catalytic converter temperature.

10. The method according to claim 1 wherein the liquid in the at least one of the exhaust gas channel of the internal combustion engine and the catalytic converter is condensation water.

11. The method according to claim 10 wherein the condensation water contains at least one of fuel, oil residues, and dissolved exhaust gas components.

12. A device for forming a simulated temperature signal representing a temperature of at least one of exhaust gas, an exhaust gas sensor, and a catalytic converter of an internal combustion engine, the device comprising:

a) means for generating at least one liquid signal indicative of an occurrence of liquid in at least one of an exhaust gas channel of the internal combustion engine and the catalytic converter; and b) means for influencing the simulated temperature signal as a function of the at least one liquid signal.

* * * * *